(12) United States Patent
Berg et al.

(10) Patent No.: US 6,676,869 B2
(45) Date of Patent: Jan. 13, 2004

(54) CONTINUOUS PROCESS FOR INDIRECT PRINTING OF POLYMERIC FILMS HAVING TEXTURE

(75) Inventors: Brandon T. Berg, West Lakeland, MN (US); Tony B. Hollobaugh, Mauldin, SC (US); David D. Nguyen, Savage, MN (US); Bruce H. Koehler, Maplewood, MN (US); Bruce A. Nerad, Oakdale, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/028,617

(22) Filed: Dec. 21, 2001

(65) Prior Publication Data

US 2003/0118783 A1 Jun. 26, 2003

(51) Int. Cl.[7] .................. B29C 43/24; B29C 59/04; B32B 31/00
(52) U.S. Cl. .................. 264/132; 264/134; 264/39; 264/167; 156/244.16
(58) Field of Search .................. 264/132, 134, 264/39, 78, 175, 210.2, 210.4, 167; 156/232, 242, 244.11, 244.16

(56) References Cited

U.S. PATENT DOCUMENTS

| | | | | |
|---|---|---|---|---|
| 3,236,712 A | * | 2/1966 | Mason | 156/231 |
| 5,471,233 A | * | 11/1995 | Okamoto et al. | 347/103 |
| 5,558,740 A | * | 9/1996 | Bernard et al. | 156/231 |
| 5,643,400 A | * | 7/1997 | Bernard et al. | 156/500 |
| 5,707,472 A | * | 1/1998 | Smith | 156/240 |
| 6,120,636 A | * | 9/2000 | Nilsen et al. | 156/230 |
| 6,296,731 B1 | * | 10/2001 | Fujii et al. | 156/209 |
| 6,325,880 B1 | * | 12/2001 | Yamashita et al. | 156/209 |
| 6,372,323 B1 | | 4/2002 | Kobe et al. | |
| 6,472,028 B1 | * | 10/2002 | Frazzitta et al. | 427/494 |
| 6,521,325 B1 | | 2/2003 | Engle et al. | |

FOREIGN PATENT DOCUMENTS

| | | |
|---|---|---|
| JP | 8216250 | 8/1996 |
| JP | 10146940 | 6/1998 |
| WO | WO 00/73082 | 12/2000 |
| WO | WO 01/58698 | 8/2001 |

* cited by examiner

Primary Examiner—Michael Colaianni
Assistant Examiner—Geoffrey P. Shipsides
(74) Attorney, Agent, or Firm—Douglas B. Little

(57) ABSTRACT

Described is a method of indirect printing on a thermoplastic film having texture, wherein said method comprises: a) providing a heated thermoplastic melt; b) providing a tool having a molding portion that comprises a texture having a surface and a plurality of cavities in said surface, and that comprises a material having a surface energy sufficient to release ink; c) applying ink to said texture; d) substantially drying or curing said ink; e) contacting said thermoplastic melt with said molding portion having ink applied to it; f) forming a texture in said thermoplastic melt, wherein said texture comprises a plurality of protrusions and an area between said protrusions, that is the inverse of the texture of said molding surface; g) transferring said ink from said molding portion to said thermoplastic melt; h) quenching said thermoplastic melt to form a thermoplastic film; and i) removing said thermoplastic film from said molding portion.

11 Claims, 9 Drawing Sheets

CONTINUOUS PROCESS FOR INDIRECT PRINTING OF POLYMERIC FILMS HAVING TEXTURE

FIELD OF THE INVENTION

The present invention relates generally to printing. More particularly, the present invention relates to a continuous process for indirect printing of polymeric films having texture during the formation of the films.

BACKGROUND OF THE INVENTION

Image graphics are omnipresent in modern life. Images that are used for product identification, marketing purposes, etc., are applied to a variety of surfaces.

The use of ink jet printing to apply such image graphics is desirable. In fact, the use of thermal and piezo ink jet inks has greatly increased in recent years with accelerated development of inexpensive and efficient ink jet printers, ink delivery systems, and the like.

Articles having replicated texture, for example, are used for a variety of purposes. A few examples of such articles, having microreplicated texture in particular, are stemmed webs, and hook and loop fasteners, etc. (See, for examples, U.S. Pat. No. 4,959,265 (Wood et al.), U.S. Pat. No. 5,845,375 (Miller et al.), which may be used for a multitude of purposes. It may be desirable to apply image graphics to these articles.

Currently, images are typically applied to the non-textured side of the articles. The problem with applying graphics to the non-textured side is that the material of the article may not be transparent, which will not allow the graphics to be seen from the textured side of the article. Another problem with printing on the non-textured side is that the ink may not be compatible with the non-textured side or with another coating that is applied to the non-textured side, such as an adhesive.

Images may also be applied to the textured side. The current processes that are known for applying images to the textured side, however, are by using lamination or printing on the surface of a completely formed article. One problem with using the known processes is the lack of durability or abrasion resistance of the image. The image may be easily worn off because the image is printed on the tops of the protrusions that provide the texture.

SUMMARY OF THE INVENTION

The inventors recognized that if an image could be printed substantially on the area between protrusions making up the textured side of a thermoplastic film, it would have good abrasion resistance. They also recognized that printing on the area between protrusions on a textured side would provide good resolution of the image. As a result, the inventors, invented a continuous method for indirect printing of an image on a textured side(s) of a thermoplastic film, having texture on at least one side, during the formation of said films.

The inventive method is a method of indirect printing on a thermoplastic film having texture, wherein said method comprises: a) providing a heated thermoplastic melt; b) providing a tool having a molding portion that comprises a texture having a surface and a plurality of cavities in said surface, and that comprises a material having a surface energy sufficient to release ink; c) applying ink to said texture; d) substantially drying or curing said ink; e) contacting said thermoplastic melt with said molding portion having ink applied to it; f) forming a texture in said thermoplastic melt, wherein said texture comprises a plurality of protrusions and an area between said protrusions, that is the inverse of the texture of said molding surface; g) transferring said ink from said molding portion to said thermoplastic melt; h) quenching said thermoplastic melt to form a thermoplastic film; and i) removing said thermoplastic film from said molding portion.

The invention also includes an article, which comprises: a) a thermoplastic film having a texture on at least one side wherein said texture comprises protrusions and an area between said protrusions; and b) ink appearing on at least a portion of said textured side wherein said ink is on less than 10% of the surface area of said protrusions.

An advantage of the present inventive method is that the image, which is different than the pattern of protrusions, appears substantially in the area between the protrusions on the textured side. Therefore, the printed images have good wear resistance. In addition, the printed images also have good resolution.

In the present invention:

"Surface energy" means energy being equal to the surface tension of the highest surface tension liquid (real or imaginary) that will completely wet a solid with a contact angle of 0 degrees, which may be determined by measuring the critical surface tension from static contact angles of pure liquids using the methods of W. A. Zisman described in "Relation of Equilibrium Contact Angle to Liquid and Solid Constitution", ACS Advances in Chemistry #43, American Chemical Society, 1961, pages 1–51.

DETAILED DESCRIPTION OF THE INVENTION

Method

Figure 1:
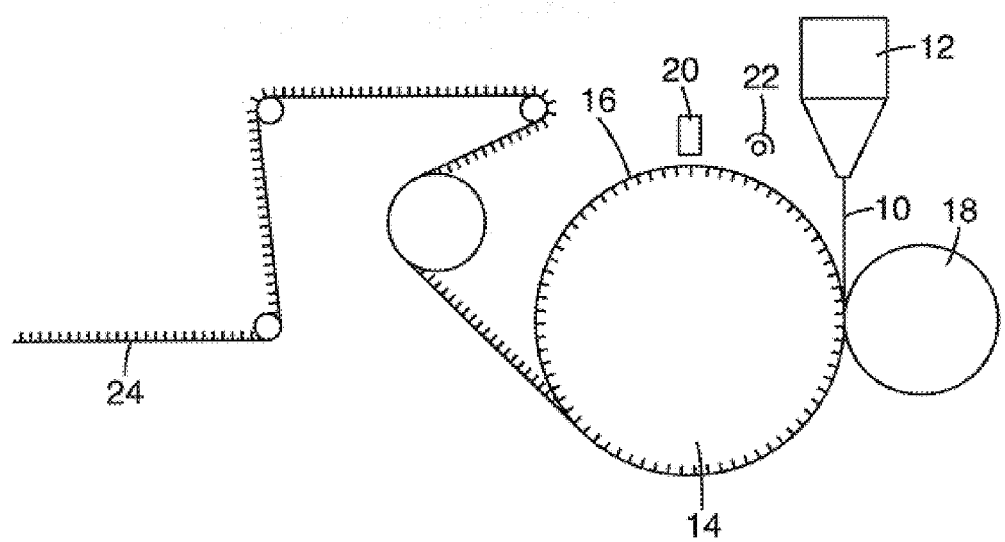
FIG. 1 is a side schematic view of one embodiment of the present inventive method.

FIG. 1 shows an embodiment of the present inventive method. A heated thermoplastic melt 10 is continuously extruded from a molten-resin extrusion means 12, which may be a die (as shown). The heated thermoplastic melt is then compressed against a tool 14 having a molding portion 16 that comprises a continuous surface and a plurality of cavities in the continuous surface that are suitable for forming texture on the thermoplastic melt 10, with the molding portion 16 being the inverse of the texture that is desired to be formed on the resultant article (thermoplastic film 24). The ink is applied to the molding portion 16, before it contacts the thermoplastic melt 10, by an ink jet printer head 20, as shown in the Figure. It is also dried or cured before the thermoplastic melt 10 is applied. A drying or curing means is shown in the Figure as 22. The drying or curing means 22 is, however, optional. For example, the ambient temperature may be warm enough to dry the ink without the need for a drying means. The printer head 20 is located above the tool 14, and applies ink on the molding portion 16 of the tool 14 in a desired pattern. The ink is substantially coated on the continuous surface of the molding portion 16. However, some may, and will probably, be applied in the cavities as well. The Figure exemplifies one possible way to contact the thermoplastic melt 10 with the molding portion 16 of a tool. This method uses a nip roll 18 to bring the thermoplastic melt 10 into contact with the molding portion 16. The ink that is coated on the molding portion 16 is transferred to the thermoplastic melt 10 as they are contacted together. Since the melt 10 is in the melt state, the ink may be substantially incorporated into the thermoplastic material. The thermoplastic melt 10 with ink is then quenched to form a thermoplastic film 24 having a texture, comprising a plurality of protrusions and an area between said protrusions, which is the inverse of the texture of the molding surface. The ink substantially appears on the area between protrusions on the thermoplastic film. The thermoplastic film 24 is then removed from the molding portion 16.

The thermoplastic melt of the present inventive method comprises at least one melt processable polymer that is able to flow at an elevated temperature and cool to hold a shape at a use temperature. A "melt processable polymer" is a polymer that flows while heated to a molten state and becomes a solid when cooled. Melt processable polymers include materials that are melted in a polymeric state or are polymerized from monomers or oligomers into polymers while at elevated temperatures.

Examples of melt processable polymers that may be used in the present inventive method to form the thermoplastic melt include, but are not limited to, polyesters, polyamides, polyolefins, poly(vinyl chloride), polypropylene, copolymers of ethylene with vinyl acetate or vinyl alcohol, polycarbonate, norborene copolymers, fluorinated thermoplastics such as copolymers and terpolymers of hexafluoropropylene, poly(ethylene terephthalate), and copolymers thereof, polyurethanes, polyimides, acrylics, plasticized polyvinyl alcohols, blends of polyvinylpyrrolidone and ethylene acrylic acid copolymer and filled versions of the above using fillers such as silicates, aluminates, feldspar, talc calcium carbonate, titanium dioxide, and the like. The thermoplastic melt may also include stabilizers, such as antioxidants, UV absorbers, etc.

The thermoplastic melt may be formed by a molten-resin extrusion means. For example, a feed stream of thermoplastic resin (or a melt processable polymer) is fed into an extruder, the resin is then heated and extruded, and then the molten resin is fed through a neck tube (that may also be heated) and into a die (that may also be heated) that forms a film-like thermoplastic melt.

Non-limiting examples of equipment useful for the extrusion include single screw extruders such as a 1¼ inch KILLION™ extruder (available from Killion Extruders, Inc. of Cedar Grove, N.J.) equipped with a gear pump such as a ZENITH™ gear pump to control flow rate, co-rotating twin screw extruders such as a 25 mm BERSTORFF™ extruder (available from Berstorff Corporation of Charlotte, N.C.) and counter-rotating twin screw extruders such as a 30 mm LEISTRITZ™ extruder (available from American Leistritz Extruder Corporation of Somerville, N.J.). Flow rate in the twin screw extruder can be controlled using weight loss feeders such as a K-TRON™ weight loss feeder (available from K-tron America of Pitman, N.J.) to feed raw material into the extruder. A film die with adjustable slot is used to form a uniform film out of the extruder.

Conditions for extrusion are chosen to meet the general requirements of forming textured articles, which are understood to the skilled artisan.

The die used to form the thermoplastic melt may be any suitable film-forming die.

The die is located at a position such that the thermoplastic melt extruded from the die can be contacted with the molding portion of the tool while in a substantially molten state.

The tool of the present inventive method has a molding portion that comprises a texture that is suitable for forming texture on the thermoplastic film, with the texture on the molding portion being the inverse of the texture that is desired to be formed on the resultant article.

There are alternative embodiments of for the tool used in the present inventive method. For example, one preferred tool comprises a molding portion on a powered, rotating roll or cylinder. The molding portion, with the texture, is on the outer part of the roll and may be made by patterning the roll surface or patterning a sleeve that is then placed over the roll surface. The melt is then contacted with the molding portion on the cylindrical tool using a nip roll. (As shown in FIG. 1).

Alternatively, the molding portion may be an independent surface that is conveyed around a portion of the roll both before and after a nip point.

Another alternative is a configuration that would allow for texture on both sides (of the two sides) of the thermoplastic melt. This configuration would be much like that shown in FIG. 1, except the nip roll would be textured as well as the molding portion on the cylindrical tool. In addition, printing could be done on both textured sides by applying ink to the nip roll also.

The molding portion of the tool (or both the tool and nip roll, if a dual-sided textured thermoplastic film is desired) must be made of a material, or at least have a coating of a material, that allows the molding portion to receive and transfer ink. The material that allows for receipt and transfer of ink is a low surface energy material. A preferred level of surface energy of the ink release coating, or the molding portion itself, is up to about 40 dynes per centimeter (dynes/cm) (0.04 Newtons/meter (N/m)). The particular preferred range is from about 14 (0.014 N/m) to about 32 dynes/cm (0.032 N/m). If the surface energy of the material that makes up the molding portion is within a required range, then the ink beads up and does not wet the surface. The beading allows for better transfer of the ink to the thermoplastic melt.

The low surface energy material may make up the molding portion of the tool or may be an outer layer of the molding portion. The low energy surface has a surface energy lower than the polymer material and ink in contact with the molding portion to permit easy removal of the imaged article (thermoplastic film) from the molding portion.

The molding portion material may comprise, for example: fluorochemicals, and polymers thereof, like that sold under the brand name TEFLON™ (available from E. I. DuPont de Nemours, Wilmington, Del.); elastomeric materials; urethanes; silicones; and other polymers, such as polypropylene and polyethylene.

The bulk of the cylindrical tool, besides the molding portion, may be made of metals, such as aluminum, stainless steel and copper, for example.

The molding portion of the tool of the present inventive method comprises a texture that is suitable for forming a texture in the resulting thermoplastic film. The molding portion comprises a surface and a plurality of cavities. The term "surface" includes both a continuous surface and a plurality of discontinuous surfaces (there will be more than one if surface is discontinuous). An example of a surface that comprises discontinuous surfaces is when the tool comprises a plurality of cavities that are channels that stretch the width of the molding portion.

The texture of the molding portion is the inverse of the texture that is desired to be formed in a resultant article. The surface of the molding portion may include structures of various types that will produce a desired structure in a resultant article. For example, the shape of the opening of the plurality of cavities (or the cross-section of the cavities) may, independently, be circular, oval, triangular, polygonal, etc.

An example of a molding portion that has a discontinuous surface with cavities is found in U.S. Pat. No. 6,190,594 (Gorman et al.) (which is incorporated herein by reference). Further examples of possible molding portion are described in the following patents, which are incorporated herein by reference, U.S. Pat. No. 4,775,310 (Fischer), U.S. Pat. No. 5,077,870 (Melbye et al.), U.S. Pat. No. 5,792,411 (Morris et al.), and U.S. Pat. No. 6,287,665 (Hammer).

Preferably, the surface is about 50% to about 99% of the projected surface area (the surface area that the surface of the molding portion would have if it was void of cavities) of the molding portion. Most preferably, the surface is about 80% to about 99% of the projected surface area of the molding portion.

Using an ink jet printer head to apply the ink is preferred in the invention. However, other printers or printing means may be used. An ink jet printer is preferred because it is efficient for use in a continuous process.

Suitable inks for the present invention include water-based inks, as well as solvent-based inks. In addition, curable inks may be used in the present invention. If curable inks are used, a curing source, such as an ultraviolet (UV) light, is used to cure the ink on the molding surface prior to contact with the thermoplastic melt. Another ink that could be used is a black-light ink (visible using a black light or light in the non-visible wavelength range). Ink jet inks can be wholly or partially water-based, such as those disclosed in U.S. Pat. No. 5,271,765 (Ma).

An ink jet printer applies the ink by deposition of ink droplets. The ink droplets may be deposited in a pattern that forms an image, such as a figure, word or logo, etc.

At least one ink is applied to at least one portion of the molding portion of the tool. The ink is applied preferably in an image, which is the mirror image of the image that is desired to appear on the textured side of the resulting thermoplastic film.

Ink jet printers generally comprise the printer itself, a computer, and software. The ink jet printer system controls the size, number and placement of the ink drops that form image graphics.

Non-limiting commercially available examples of ink jet printers include thermal ink jet printers such as DESKJET™ brand, PAINTJET™ brand, DESKWRITER™ brand, DESIGNJET™ brand, and other printers commercially available from Hewlett Packard Corporation of Palo Alto, Calif., and the NovaJet brand wide format printers commercially available from Encad, Inc., San Diego, Calif. Also included are piezo type ink jet printers such as those from Seiko-Epson, Raster Graphics, and Xerox, spray jet printers, and continuous ink jet printers. Any of these commercially available printing techniques introduce the ink in a jet spray of a specific image. Another example of a printer is the BUD-JET IV 128 ULTRA-MARK™ from Fas-Co Coders, Inc., Chandler, Ariz. Any of the above printers can be attached to a computer to print computer-generated images.

Depending upon the image that is desired on the resultant article, combinations of different colors of inks may be applied to the tool.

A variety of ink jet inks may be used and are obtainable from many commercial sources. It should be understood that each of these inks has a different formulation, even for different colors within the same ink family. Non-limiting sources of inks include Minnesota Mining and Manufacturing Company, (St. Paul, Minn.), Encad Corporation, Hewlett Packard Corporation, and the like. These inks are preferably designed to work with the ink jet printers described above.

After the ink is applied to the molding portion (or a portion thereof) it is dried and/or cured. The curing source depends upon the ink that is used. Inks that are cured by ultraviolet light, for example, will be exposed to ultraviolet light. The ink is substantially dried and/or cured prior to being contacted with the thermoplastic melt.

The molding portion with the dried and/or cured ink on it is then contacted with the thermoplastic melt. The ink is then transferred from the molding portion of the tool to the film. The molding portion of the tool has a texture the inverse of which is imprinted into the thermoplastic film upon contact of the thermoplastic melt with the molding portion.

The nip roll 18 in FIG. 1 is one alternative in the present inventive method for pressing the film 10 against the molding surface 16 of the tool, which shapes or provides structure to the film. However, alternative configurations are also contemplated by the present application.

After the ink has been transferred, the thermoplastic melt is quenched. This solidifies the thermoplastic melt into a thermoplastic film. Quenching may be done by using, for example, a fluid-cooled tool or an air-cooled tool.

The next step is removal of the molding portion from the thermoplastic film.

The thermoplastic film will comprise a plurality of protrusions and an area between said protrusions. The aspect ratio (the ratio of the height of the protrusion to the width of the protrusion at the widest portion of the cross-section of the protrusion) of the plurality of protrusions is preferably greater than about 1:1. Most preferably it is greater than about 2:1.

Article

The invention also includes an article, which comprises: a) a thermoplastic film having a texture on at least one side wherein said texture comprises protrusions and an area between said protrusions; and b) ink appearing on said on at least a portion of said textured side wherein said ink is on less than 10% of the surface area of said protrusions. More preferably, the ink is on less than 5% of the surface area of said protrusions, which are surrounded by an inked areas between said protrusions.

EXAMPLES

This invention is further illustrated by the following examples that are not intended to limit the scope of the invention. In the examples, all parts, ratios and percentages are by weight unless otherwise indicated. The following test methods were used to characterize the stemmed web compositions in the following examples:

Test Methods

Abrasion Test

An abrasion tester (Model CS-39 available from Standard Scientific Supply Company, Bethlehem, Pa.) was used to determine the abrasion resistance of an image on the textured side of the samples. Two circular sections with a diameter of about 114 mm (4.5 in) were cut from the sample. The smooth side of one section was adhered with double-coated pressure-sensitive adhesive tape to the surface of the upper disc of the tester, while the other was adhered the same way to the lower disc. The discs were brought in contact with a weight of about 1.4 kg (3 lb) and the tester was operated for 500 cycles. Pictures were taken of the resulting image.

Tape Snap Test

Ink adhesion was evaluated using the Tape Snap Test (ASTM #3359). The Tape Snap Test consists of scoring an ink layer with the corner of a single edge razor blade without damaging the underlying print surface, making lines approximately 1 cm apart in a cross-hatched pattern. A piece of Scotch™ 610 tape (3M) approximately 10 cm long was applied to the cross-hatched area using a PA1 applicator (3M), bonding approximately 8 cm of the tape to the ink, leaving one end free. The tape was peeled back at approximately 180° as rapidly as possible. An excellent result was when no ink was removed by the tape; a good result was when about 5% or less was removed; a poor result was when about 5%–25% of the ink was removed; a failure was when nearly all the ink was removed.

Image Quality Test

The quality of the image was subjectively determined by observation. The quality was considered "excellent" if the appearance of the resulting image, to the human eye, closely approximated the image that was programmed into the print head. Typically this also meant that the image looked crisp. By contrast, image quality was considered "poor" if the lines of the image were significantly wider than that of the image programmed into the print head. Typically this resulted in the appearance of a blurred image.

The following process was used in the Examples:

Process Description

Two rolls (a tool and a nip roll) formed a nip point having a nip pressure of 345 kPa (50 psi). The first roll (tool) presented a molding portion that was heated to 38° C. and contained one of two patterns of cavities. The second roll (nip roll) had a chrome-plated surface that was also heated to 38° C.

Two different molding portions (with different patterns of cavities, and each with a continuous surface between cavities) were used in the process. Molding Portion A contained cavities with diameters of about 380 microns (15 mils), depths in excess of about 2.5 mm (100 mils) and spacing of about 940 microns (37 mils), resulting in an article having a protrusion array with a protrusion density of nominally about 62 protrusion/cm$^2$ (400 protrusion/in$^2$) and a projected protrusion area of about 7%. Molding Portion B contained cavities with diameters of about 216 microns (8.5 mils), depths in excess of about 1.0 mm (30 mils) and spacing of about 457 microns (18 mils), resulting in and article having a protrusion array with a protrusion density of nominally about 390 protrusion/cm$^2$ (3000 protrusion/in$^2$) and projected protrusion area of about 17%.

Two types of ink were used, a solvent-based ink or an ultraviolet (UV) light curable ink. The ink was image-wise applied with an ink jet print head (Model XJ128-200 with 128 ink jet nozzles, available from Xaar Americas, Schaumburg, Ill.). It was applied to the surface of the molding portion about 356 mm before the nip point to permit the ink to either air dry or cure upon exposure to UV radiation. UV-curable ink was cured at a line speed of 30.5 mm/sec (1.2 in/sec) by exposure to 370 mW/cm$^2$ of UV-A radiation, 330 mW/cm$^2$ of UV-B radiation, 29 mW/cm$^2$ of UV-C radiation and 150 mW/cm$^2$ of UV-V radiation from a UV radiation source, Portable 2 UV Curing Unit, available from UV Process Supply Inc., Chicago, Ill. Ink was delivered at about 36 dots per cm (92.5 dots per in) utilizing a firing frequency of 185 Hz.

A melt processable polymer, one of the polymers listed in Table 1, was melted and conveyed with a single screw extruder (Model KTS125, available from Killion Extruders, Inc. of Cedar Grove, N.J.) in a similar manner for each polymer. The extruder had a diameter of about 63 mm (2.5 in), a length: diameter ratio (L/D) of 30/1, a screw speed of 10 rpm and a rising temperature profile up to approximately 216° C. The polymer was passed through the extruder and continuously discharged at a pressure of at least about 0.69 MPa (100 psi) through a heated neck tube (custom-made) and into a 356 mm (14 in) wide die (EBR III Internal Deckled extrusion die Model JO9601501, available from Cloeren Company, Orange, Tex.). The die was set at approximately 216° C. and the die gap was 0.76 mm (30 mils). The thermoplastic melt was discharged from the die and drop fed onto the molding portion near the nip point. As the thermoplastic melt was passed between the tool and the nip roll, the thermoplastic melt was pressed into the cavities to form a thermoplastic melt having a texture on the side of the melt that was in contact with the molding portion. As the thermoplastic melt left the nip point, the thermoplastic melt was quenched to form a textured thermoplastic film (having a textured side and a non-textured side) and the resulting thermoplastic film was removed from the molding portion at a rate of about 3.0 m/min (10 fpm). A textured thermoplastic film was formed with an image on the textured side. The textured side comprised a plurality of protrusions and an area between the protrusions. The diameter and height of the protrusions made with Molding Portion A were approximately 381 and 1016 microns ($\mu$m), respectively. The diameter and height of the protrusions made with Molding Portion B were approximately 216 and 559 $\mu$m, respectively.

Materials Used

A variety of polymeric materials and inks were used in the preparation of the samples of the examples. These materials are summarized in Table 1.

TABLE 1

| Material | Description |
| --- | --- |
| REXENE ™ W101 | Significantly atactic polypropylene available from Huntsman Polypropylene Corp., Woodbury, New Jersey. |
| KRATON ™ D1117 | A styrene-isoprene block copolymer available from Shell Chemical Company, Houston Texas. |
| Polypropylene 3155 | Isotactic polypropylene available from Exxon Chemical Co., Houston, Texas. |
| ESTANE ™ 58238 | Polyurethane available from Noveon, Inc., Cleveland, Ohio. |
| Solvent-based ink | Ink available as SCOTCHCAL ™ 3795 Black from 3M Company, St. Paul Minnesota. |
| UV-curable ink | Ink available as XAARJET ™ XUV Black from Xaar Americas, Schaumburg, Illinois. |

Example 1 and Comparative Example 1

These examples illustrate the effect of application of an image to a film before or during formation, and the image's adhesion to the thermoplastic film.

In Example 1, the polymer was REXENE™ W101, the ink was solvent-based and the molding portion was Molding Portion A resulting in a protrusion density of 62 protrusion/$cm^2$ (400 protrusion/$in^2$). The sample was observed for image quality and presence of ink on the protrusions, and tested with the Abrasion Test. In addition, ink was applied to the smooth back-side (non-textured side) of the sample to determine the tendency for this ink to adhere to the thermoplastic film with the Tape Snap Test.

Figure 2:
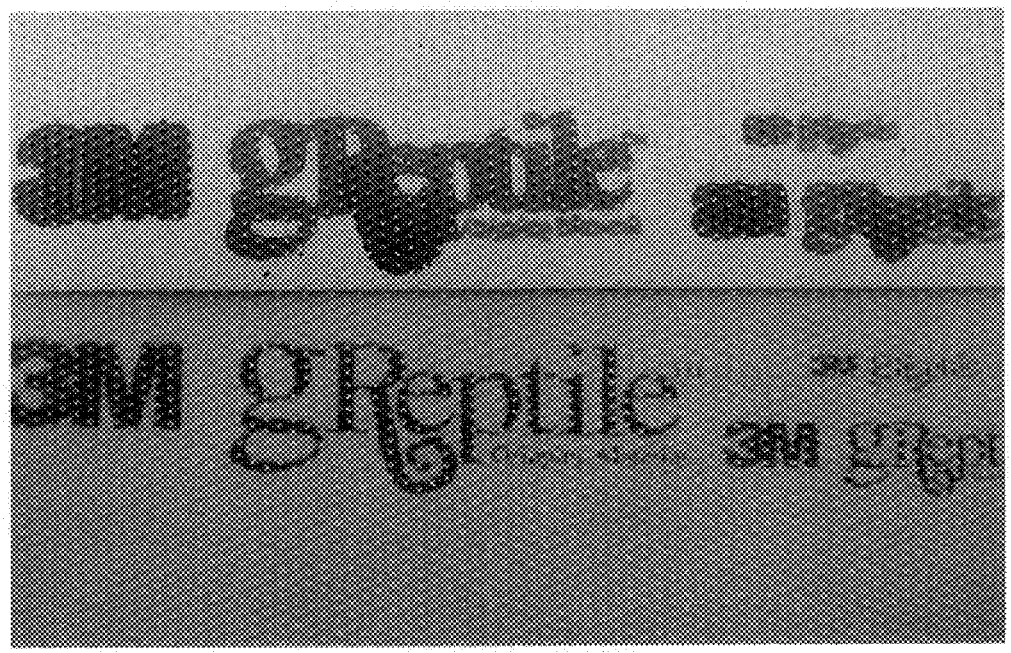
FIG. 2 is a digital image showing the samples from Example 1 (bottom of digital image) and Comparative Example 1 (top of digital image)
Figure 3A:
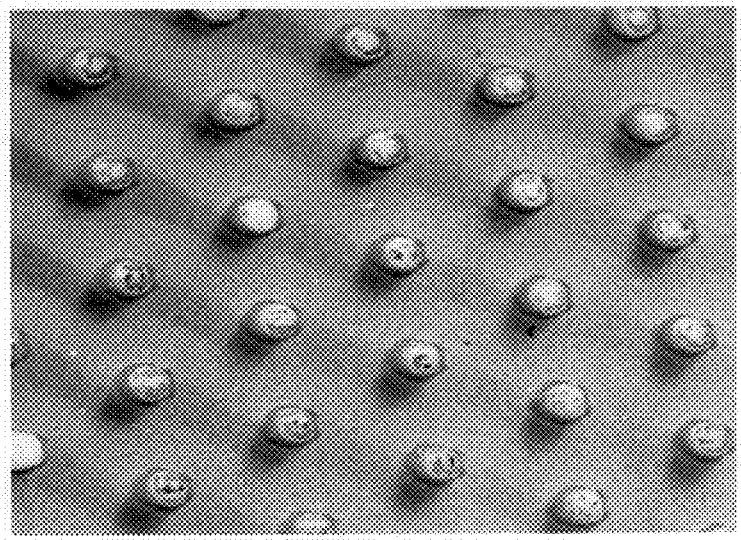
FIG. 3a is a digital image of a top view and close up view of the sample from Comparative Example 1.
Figure 3B:
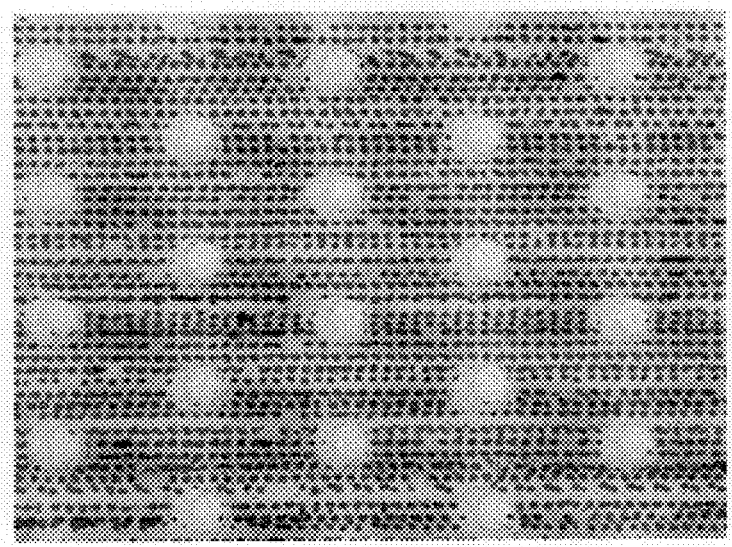
FIG. 3b is a digital image of a top view and close up view of the sample from Example 1.
Figure 3C:
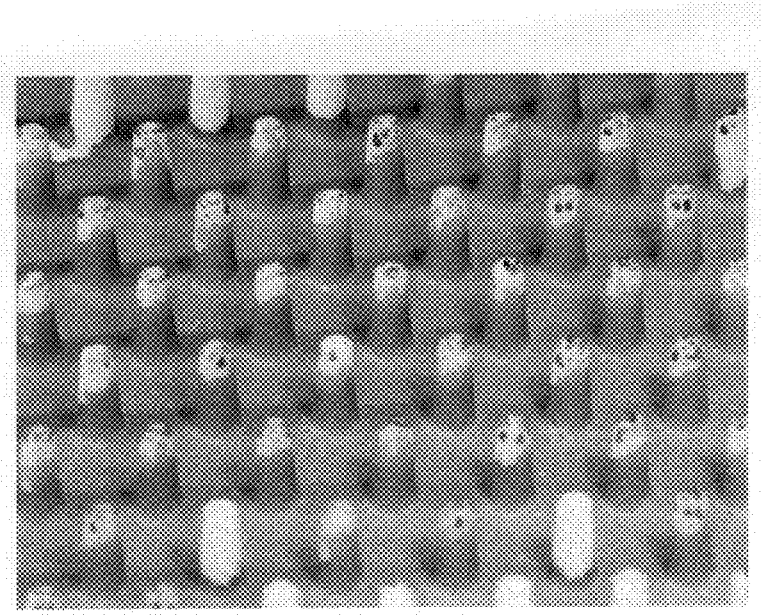
FIG. 3c is a digital image of an angled view and close up view of the sample from Comparative Example 1.
Figure 3D:
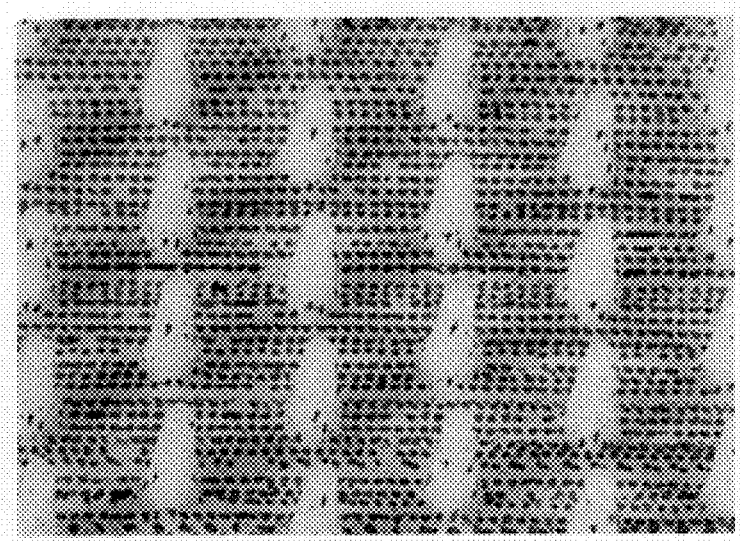
FIG. 3d is a digital image of an angled view and close up view of the sample from Example 1.
Figure 4A:
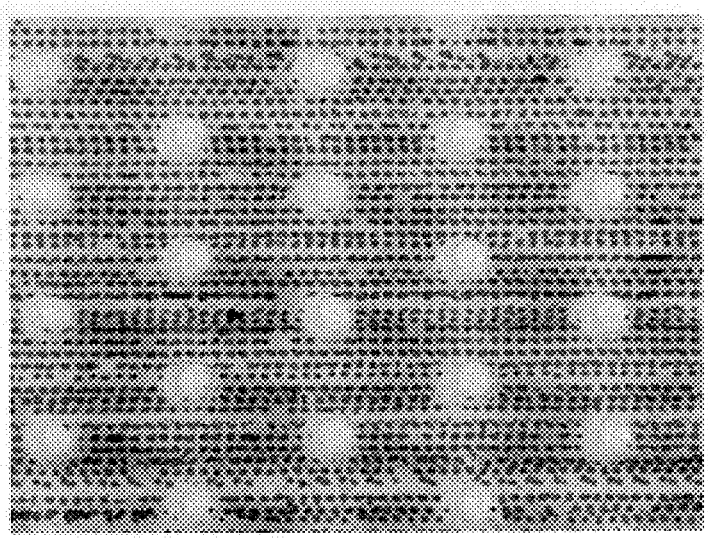
FIG. 4a is a digital image of a top view and close up view of the sample from Example 1 before Abrasion Test.
Figure 4B:
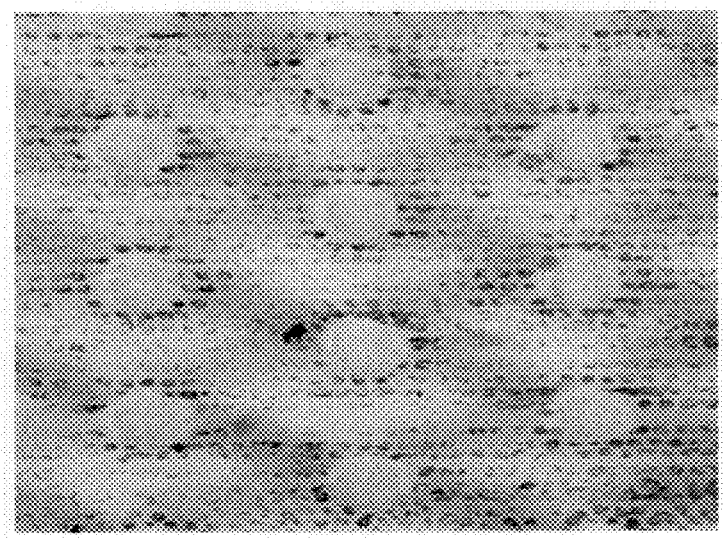
FIG. 4b is a digital image of a top view and close up view of the sample from Comparative Example 1 after Abrasion Test.
Figure 4C:
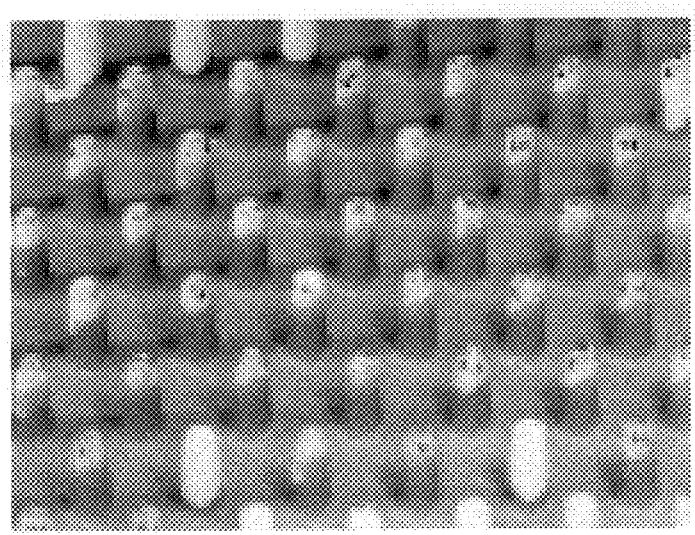
FIG. 4c is a digital image of a top view and close up view of the sample from Example 1 after Abrasion Test.
Figure 4D:
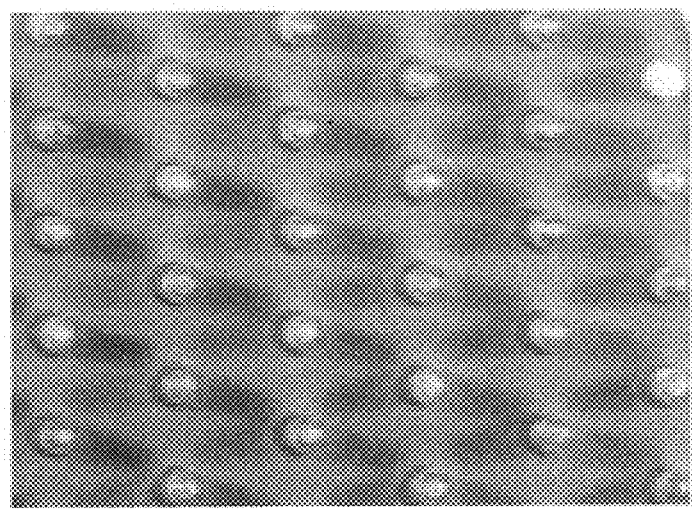
FIG. 4d is a digital image of a top view and close up view of the sample from Comparative Example 1 before Abrasion Test.
Figure 5A:
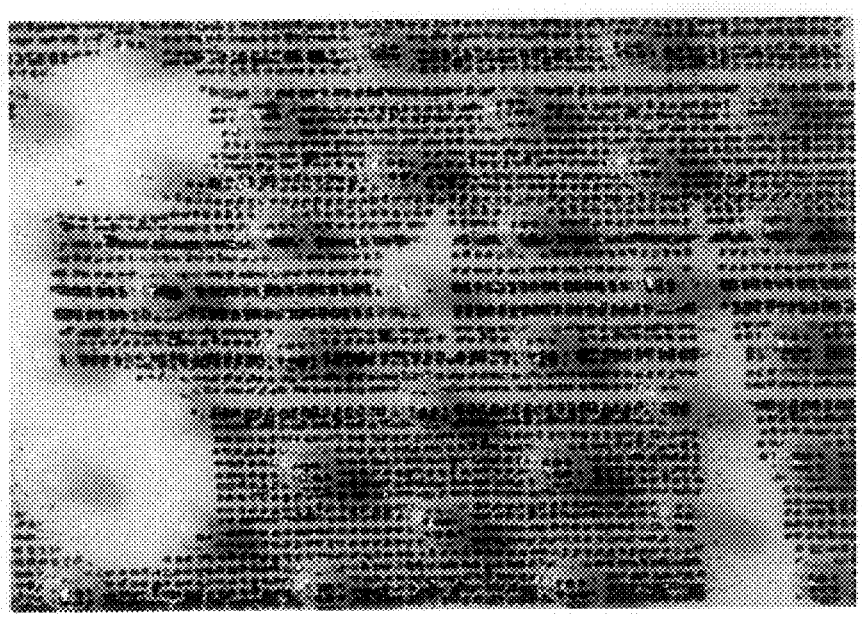
FIG. 5a is a digital image of a top view and close up view of the sample from Comparative Example 2 before Abrasion Test.
Figure 5B:
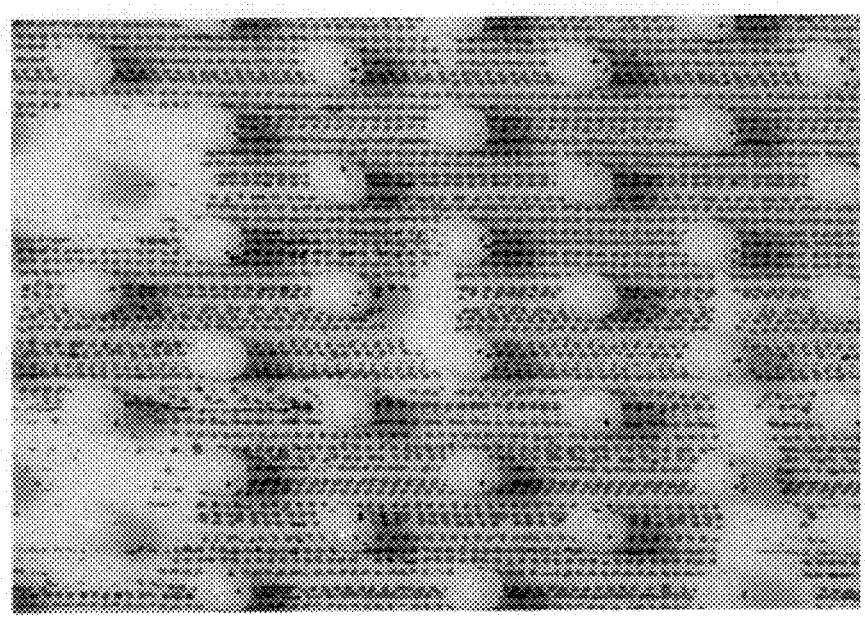
FIG. 5b is a digital image of a top view and close up view of the sample from Example 2 before Abrasion Test.
Figure 5C:
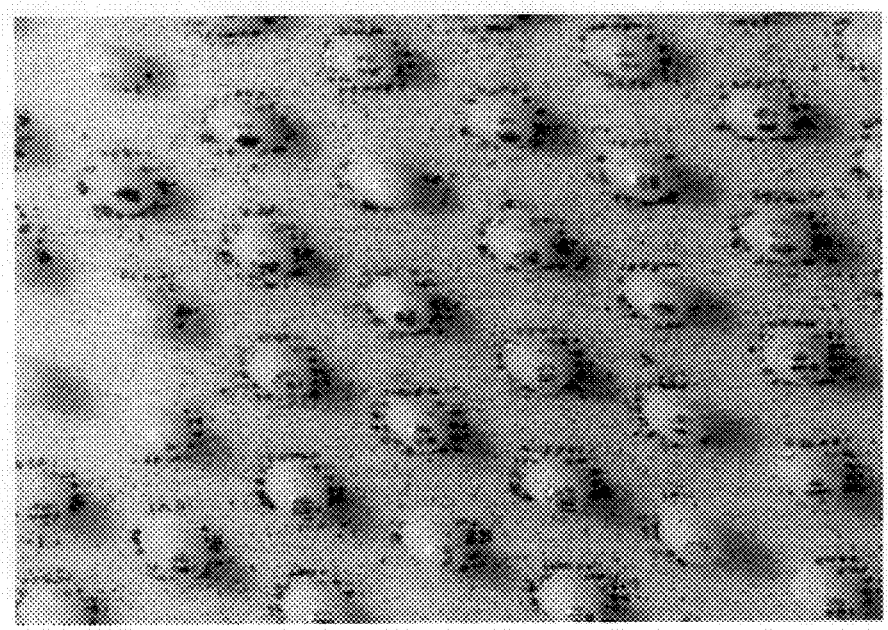
FIG. 5c is a digital image of a top view and close up view of the sample from Comparative Example 2 after Abrasion Test.
Figure 5D:
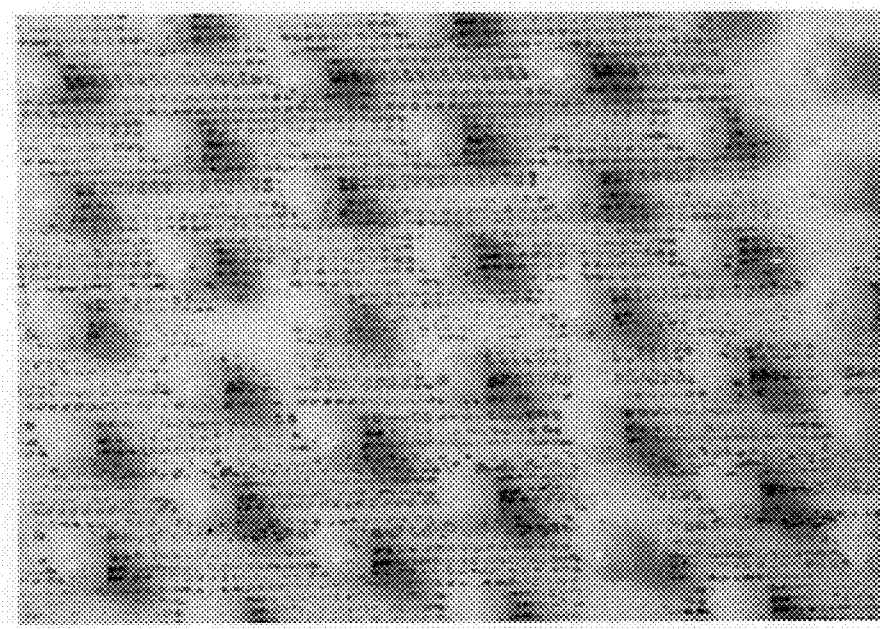
FIG. 5d is a digital image of a top view and close up view of the sample from Example 2 after Abrasion Test.

Comparative Example 1 was made as Example 1 with the same image, except ink was applied directly onto the textured side of a textured thermoplastic film after the film was already formed. Image quality for Example 1 was excellent. FIG. 2 shows the textured side with the image of Example 1 (bottom portion of digital image) and Comparative Example 1 (top portion of digital image). As seen, the image is excellent (crisp) for Example 1 but poor (blurred) for Comparative Example 1. FIGS. 3a–3d are magnified views of the textured side with the image of Example 1 and Comparative Example 1 from either a top-down perspective (3a and 3b) or an angled-viewing perspective (3c and 3d). As seen, little ink appears on the protrusions of Example 1 (3b and 3d). In addition, distinct droplets of ink appear on the area between protrusions. In contrast, the tops and much of the sides of the protrusions of Comparative Example 1 (3a and 3c) are coated with ink and the area between protrusions does not show distinct droplets but rather a continuous coating of ink. The appearance of drops provide a better or sharper image.

In addition, the durability of the images of Example 1 and Comparative Example 1 was evaluated with the Abrasion Test. FIGS. 4a–4d show the magnified views of the textured side with the image of Example 1 (4a and 4b) and Comparative Example 1 (4c and 4d) before and after the test was performed. As seen, more ink remains (after the Abrasion Test) on the image with Example 1 (4b) than with Comparative Example 1 (4d). The same ink used on the textured side was applied to the smooth polymer side of Example 1 and evaluated with the Tape Snap Test. The ink adhesion by this test was a failure because nearly all of the ink was removed.

Example 2 and Comparative Example 2

This example illustrates the image durability with a different polymer.

Example 2 and Comparative Example 2 were made as Example 1 and Comparative Example 1, respectively, except the polymer was KRATON™ D1117. The durability of the images of Example 2 and Comparative Example 2 was evaluated with the Abrasion Test. FIGS. 5a–5d show the magnified views of the textured side having an image of Example 2 (5b and 5d) and Comparative Example 2 (5a and 5c) before and after the test was performed. As seen, more ink remains on the textured surface of the image in Example 2 (5d) than Comparative Example 2 (5c). Also, dots of ink were visible with both Example 2 and Comparative Example 2.

Example 3

This example illustrates the image quality of the invention with a different polymer and ink.

Figure 6:
FIG. 6 is a digital image of the sample from Example 3.

Example 3 was made as Example 1 except the polymer was Polypropylene 3115 and the ink was UV-curable. FIG. 6 shows the imaged surface of Example 3. As seen the image quality is excellent and comparable to that seen in FIG. 2 for Example 1.

Example 4

This example illustrates the effect of protrusion density on an imaged surface made with the invention.

Figure 7:
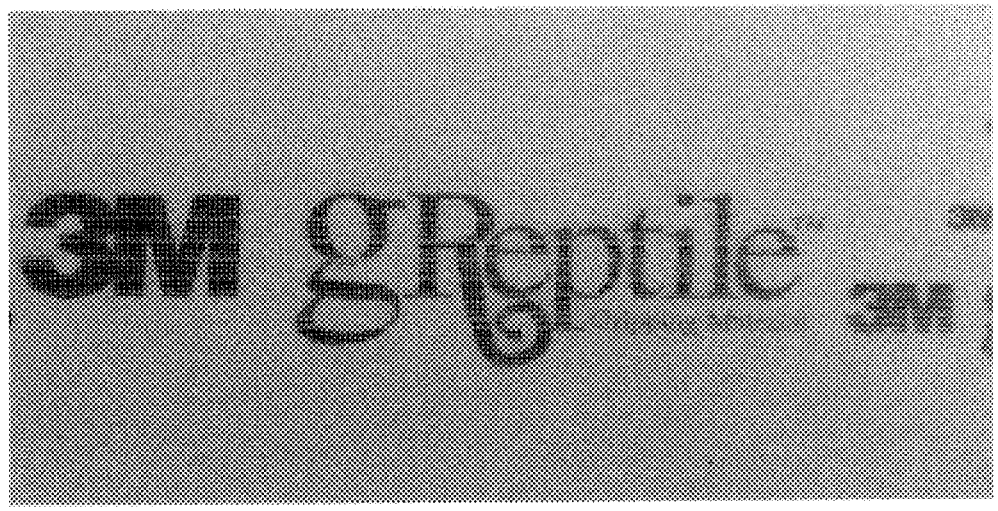
FIG. 7 is a digital image of the sample from Example 4.

Example 4 was made as Example 1 except the polymer was ESTANE™ 58238 and the protrusions were made with Molding Portion B resulting in a protrusion density of 390 protrusion/$cm^2$ (3000 protrusion/$in^2$). FIG. 7 shows the imaged surface of Example 4. As seen the image quality is excellent and comparable to that seen in FIG. 2 for Example 1. In either case (different protrusion densities), a good image resulted.

What is claimed is:

1. A method of indirect printing on a thermoplastic film having an array of protrusions and an area between said protrusions, wherein said method comprises:
   a. providing a heated thermoplastic melt;
   b. providing a tool having a molding portion having a surface and a plurality of cavities in said surface, and that comprises a material having a surface energy sufficient to release ink;
   c. applying ink to said surface of the tool;
   d. substantially drying or curing said ink on the surface of the tool;
   e. contacting said thermoplastic melt with said molding portion having ink applied to it;
   f. forming in said thermoplastic melt, an array of protrusions having an aspect ratio greater than 2:1 corresponding to the cavities in the tool of part b and an area between said protrusions corresponding to the surface of the tool;
   g. transferring said ink from the surface of said tool to said thermoplastic melt in the area between the protrusions;
   h. quenching said thermoplastic melt to form a thermoplastic film; and
   i. removing said thermoplastic film from said molding portion.

2. The method of claim 1 wherein said heated thermoplastic melt is formed by a molten-resin extrusion means.

3. The method of claim 1 wherein said heated thermoplastic melt is formed by extrusion of a feed stream of thermoplastic resin that is then passed through a die to form the heated thermoplastic melt.

4. The method of claim 1 wherein said molding portion material has a surface energy of from about 14 to about 32 dynes per centimeter.

5. The method of claim 1 wherein said ink is applied to said molding portion in a pattern and said ink on said thermoplastic film then appears in an image having the mirror-image of said pattern.

6. The method of claim 1 wherein said ink is applied to the molding portion using an ink jet printer.

7. The method of claim 1 wherein said surface is about 50% to about 99% of the projected surface area of the molding portion.

8. The method of claim 1 wherein said surface is about 80% to about 99% of the projected surface area of the molding portion.

9. The method of claim 1 wherein the surface comprises a continuous surface.

10. The method of claim 1 wherein the surface comprises a plurality of discontinuous surfaces.

11. The method of claim 1 in which the cavities in the tool and the protrusions on the thermoplastic film have a cross-sectional shape selected from circular, oval, and polygonal.

* * * * *

UNITED STATES PATENT AND TRADEMARK OFFICE
CERTIFICATE OF CORRECTION

PATENT NO. : 6,676,869 B2 Page 1 of 1
DATED : January 13, 2004
INVENTOR(S) : Berg, Brandon T.

It is certified that error appears in the above-identified patent and that said Letters Patent is hereby corrected as shown below:

<u>Title page,</u>
Item [56], References Cited, U.S. PATENT DOCUMENTS, add the following patents:
-- 4,775,310    10/1988    Fischer
   4,959,265    09/1990    Wood et al.
   5,077,870    01/1992    Melbye et al.
   5,271,765    12/1993    Ma
   5,545,280    08/1996    Wenz
   5,792,411    08/1998    Morris et al.
   5,845,375    12/1998    Miller et al.
   6,013,347    01/2000    Martin et al.
   6,190,594 B1 02/2001    Gorman et al.
   6,287,665 B1 09/2001    Hammer --
FOREIGN PATENT DOCUMENTS, add the following patents:
-- EP    0825038 A2    02/1998
   EP    0836927 A1    04/1998
   GB    968325        09/1964
   GB    2322597 A     09/1998
   WO    WO 99/04080   01/1999
   WO    WO 98/20767   05/1998
   WO    WO 99/55537   11/1999
   JP    10035080      07/1996 --

Signed and Sealed this

Second Day of August, 2005

JON W. DUDAS
*Director of the United States Patent and Trademark Office*